US005200594A

United States Patent [19]

Okada et al.

[11] Patent Number: 5,200,594

[45] Date of Patent: Apr. 6, 1993

[54] ELECTRODE FOR USE IN PLASMA ARC WORKING TORCH

[75] Inventors: Toshihiko Okada, Takatsuki; Masanobu Uchida, Suita; Hiroshi Fujiwara, Higashiosaka, all of Japan

[73] Assignee: Daihen Corporation, Osaka, Japan

[21] Appl. No.: 721,175

[22] Filed: Jun. 26, 1991

[30] Foreign Application Priority Data

Jun. 26, 1990 [JP] Japan .................................. 2-167978
Jun. 26, 1990 [JP] Japan .................................. 2-167979

[51] Int. Cl.$^5$ .................................................. B23K 9/00

[52] U.S. Cl. ............................... 219/121.52; 219/119; 219/121.49

[58] Field of Search ........................ 219/121.52, 121.48, 219/119, 75, 121.39, 121.59, 121.49

[56] References Cited

U.S. PATENT DOCUMENTS 3,198,932 8/1965 Weatherly .
3,597,649 8/1971 Bykhovsky et al. .
3,930,139 12/1975 Bykhovsky et al. .................. 219/75
3,944,778 3/1976 Bykhovsky et al. .
4,766,349 8/1988 Johansson et al. ............. 219/121.52
4,769,524 9/1988 Hardwick ........................ 219/121.52
5,023,425 6/1991 Severance Jr. ................. 219/121.52

FOREIGN PATENT DOCUMENTS 2582973 12/1986 France .

OTHER PUBLICATIONS

Patent Abstracts of Japan, vol. 10, No. 118 (M-475) (2175) May 2, 1986 (English Abstract of JP 60/247,491).
E. Luder, "Handbuch der Lottechnik", 1952, Verlag Technik Berlin, Berlin, DE, pp. 347-348.

*Primary Examiner*—Mark H. Paschall
*Attorney, Agent, or Firm*—Scully, Scott, Murphy & Presser

[57] ABSTRACT

An electrode for use in a plasma arc working torch having an insert of refractory metal inserted in the hollow formed in a base electrode is disclosed wherein the insert has a nickel film electroplated and a noble metal film plated thereon and is mounted in a pressed state. It is also disclosed that a metal having a low melting point is filled in a space defined by the hollow of the base electrode and the end face of the insert.

4 Claims, 6 Drawing Sheets

ELECTRODE FOR USE IN PLASMA ARC WORKING TORCH

BACKGROUND OF THE INVENTION

1. Field of the Invention

The present invention relates to a main electrode for use in plasma arc working torch which is capable of welding or cutting works.

2. Description of the Prior Art

A plasma arc working torch known in the prior art is generally in a structure shown in FIG. 7 wherein reference numeral 1 designates a plasma electrode which is cooled by a cooling agent. The electrode 1 is composed of an base electrode 2 in a pipe form and an insert of refractory metal 3 inserted in a hollow portion at the end of the base electrode 2. The base electrode 2 can be made of copper metal or copper alloy while the refractory metal can be made of hafnium metal or zirconium metal. Reference numeral 4 designates an electrode supporting member for supporting the electrode 1, which is made of electrically conductive material. Reference numeral 5 designates an insulating sleeve formed at the outside of the electrode supporting member 4. Reference numeral 6 designates a tip supporting member which is formed at the outside of the insulating sleeve 5 and is made of electrically conductive material. A torch body 7 is constructed from the electrode supporting member 4, the insulating sleeve 5 and the tip supporting member 6.

Reference numeral 8 designates a tip electrode in a hollow form supported at the end of the tip supporting member 6. The tip electrode 8 has a plasma jet hole 801 formed at the center of the end thereof. Reference numeral 9 designates an insulating cap and reference numeral 10 designates a guide pipe for cooling water. Cooling water supplied from a supplying hose 11 cools directly the main electrode 1 and flows into the path shown by an arrow and finally goes out from the torch trough a drain hose 12.

In the torch mentioned above, an electric power is supplied between the main electrode 1 and the work while a plasma forming gas such as air, oxygen gas or nitrogen gas is spouted from the plasma jet hole 801 at the tip electrode 8 to generate a plasma jet. The working of the work can be carried out with this plasma jet.

In the operation of the torch shown in FIG. 7, high voltage of a high frequency generated by a high frequency generator 14 is applied, through a capacitor 15, between the main electrode 1 and the tip electrode 8 to generate a so-called pilot arc. This pilot arc is spouted from the plasma jet hole 801 of the tip electrode 8 by the action of a flow of the plasma forming gas. When the torch (T) is brought near the work 13 with keeping the pilot arc, a working arc is generated between the main electrode 1 and the work 13. When the working arc has been generated once, the pilot arc at the tip electrode disappears because there is a resistor 16 on the way of the electric path for generating the pilot arc. It should be noted that the high frequency generator 14 stops its operation with the generation of the pilot arc.

The plasma arc working torch in the structure mentioned above has the following disadvantage: The main electrode 1 is cooled always but is heated up to a high temperature during the working time. U.S. Pat. No. 3,597,649 discloses the main electrode 1 composed of the base electrode 2 and an insert of refractory metal 3 such as hafnium inserted into the hollow of the end of the base electrode 2. However, even with this main electrode 1, the operation life is still short due to the high temperature of the main electrode.

On the other hand, the U.S. Pat. No. 3,198,932 discloses the main electrode 1 in which a high-heat insert 3 of zirconium refractory metal is plated with zinc film by immersing into a molten zinc chloride and further plated with silver film by immersing into a molten silver metal. The high-heat insert 3 of zirconium refractory metal having a zinc film and a silver film plated sequentially thereon is soldered to the hollow of the end of the base electrode 2 by using silver soldering material. In this case, a zinc oxide film is formed on the surface of the plated zinc film and prevents the heat transmission from the zinc film to the silver film. As a result, the heat generated at the high-heat insert 3 of zirconium refractory metal is not conveyed rapidly to the base electrode 2. This does not result in an improvement in the operation life of the main electrode 1 as high as expected. Further, the zinc film obtained by immersing the high-heat insert 3 of zirconium refractory metal into the molten zinc chloride separates easily from the insert of zirconium refractory metal 3. Therefore, the plated insert of zirconium refractory metal 3 is undersirably apt to have the plated films separated easily therefrom when subjected to the external force during a working time period until the completion of the silver soldering work to the hollow of the end of the base electrode 2. Further the insert 3 of zirconium refractory metal is heated up to a high temperature during the work of the plasma arc working torch. As a result, the silver soldering material for soldering the insert 3 of zirconium refractory metal to the hollow of the end of the base electrode 2 melts and forces the insert 3 to separate from the base electrode 2.

Further, U.S. Pat. No. 3,944,778 describes an improved main electrode for use in a plasma arc working torch in a structure as described below. A cooling holder 1 is made of an electrically conductive metal having a high thermal conduction such as copper. There is provided a room 7 between the cooling holder 1 and a relating thin insert 2 of a refractory metal. The room 7 is fulfilled with a material having a lower thermal conduction than that of the cooling holder 1. Since the thermal conduction of the material fulfilling the room 7 is lower than that of the cooling holder 1, the heat transmission from the periphery of the thin insert of a refractory metal 2 is higher than that from the center of the thin insert of a refractory metal 2. That is, the purpose of this structure is to localize the arc generating point to the effective center of the thin insert 2 of a refractory metal by over-heating forcedly the center of the thin insert 2. In other words, the temperature distribution at the working surface of the thin insert 2 is controlled by over-heating forcedly only the center of the thin insert. It is necessary for the achievement of this effect to make the thin insert 2 thinner, that is, to make the height of the thin insert 2 lower than the diameter thereof. Such a thin insert 2 of a refractory metal having a height smaller than the diameter undesirablly results in a short operation life of the plasma arc working torch.

SUMMARY OF THE INVENTION

An object of the present invention is to provide an electrode for use in a plasma arc working torch characterized by a longer operation life achieved by forcing the heat at an insert of refractory metal to flow rapidly to a base electrode.

Another object of the present invention is to provide a main electrode for use in a plasma arc working torch, which can be easily manufactured in a reliable way.

In order to achieve the above object, the present invention is to provide an improved main electrode which is for use in a plasma arc working torch and having an insert of refractory metal inserted in the hollow formed in a base electrode which is composed of copper or copper alloy and is cooled by a cooling agent. The insert of refractory metal has a nickel film electroplated and a noble metal film plated thereon in a sequential way and the hollow has a diameter slightly larger than that of the insert of refractory metal. The insert of refractory metal is inserted in the hollow. The base electrode having the insert of refractory metal inserted in the hollow is pressed through pressing tools in a direction from the periphery to the center thereof and is grounded at the projected part produced with the pressing work by any available mechanical work so that both heading faces of the resultant base electrode and said insert of refractory metal are positioned at the same horizontal plane.

A main electrode for use in a plasma arc working torch having an insert of refractory metal inserted in the hollow formed in a base electrode which is composed of copper or copper alloy and is cooled by a cooling agent, wherein a room is formed between the bottom face of said hollow and the end face of said insert of refractory metal and has a material with a lower melting point than that of said base electrode included therein.

A main electrode for use in a plasma arc working torch according to the present invention has an insert of refractory metal plated electrochemically with nickel which is in a high adhesion strength with a refractory metal such as hafnium or zirconium. Accordingly, it is possible to reduce largely the frequency of separation between the insert of refractory metal and the plated nickel or plated noble metal. Furthermore, the plated nickel essentially does not form the nickel oxide. As a result, the heat generated during the working of the plasma arc working torch is transmitted rapidly from the plated nickel film to a base electrode through a plated noble metal film and is finally absorbed by a cooling agent for the base electrode. The electrode accordingly is not over-heated up to a temperature higher than a given temperature and is provided with a longer operation life than the previous electrode for the plasma arc working torch. Further, the high adhesion strength between the plated nickel film and the insert of refractory metal prevents the separation of the plated nickel film from the insert of refractory metal even when the base electrode is pressed from the periphery to the center or even when the insert of refractory metal is mounted on the hollow of the end of the base electrode under pressure. Further, the insert of refractory metal is pressure-mounted on the hollow of the end of the base electrode and is surely connected to the base electrode by the mounting pressure even when the main electrode is heated.

During the work of a plasma arc working torch, the insert of refractory metal is heated to a temperature of about 1000° C. at the heading part and to a temperature of about 600° C. at the end terminal facing to the bottom face of the hollow. In accordance with claim 2 of the present invention, a material having a low melting point is filled in a room between the base electrode and the insert of refractory metal. The material having a low melting point melts during the work of a plasma arc working torch and causes the thermal connection between the end face of the insert of refractory metal and the bottom face of the hollow of the base electrode. Therefore, it is possible to make a thermal connection between the end face of the insert of refractory metal and the bottom face of the hollow of the base electrode by using the molten material having a low melting point even when there is no actual engagement among the bottom face of the hollow of the base electrode, the end face of the insert of refractory metal and the material having a low melting point, which is positioned between the end face of the insert of refractory metal and the bottom face of the hollow. Accordingly, the heat generated at the insert of refractory metal is transmitted rapidly to the base electrode through the thermal connection due to the molten material having a low melting point and is absorbed by a cooling agent for the base electrode. This prevents the main electrode from being over-heated and ensures a long operation life of the main electrode.

BRIEF DESCRIPTION OF THE DRAWINGS

These and other objects and features of the present invention will become clear from the following description taken in conjunction with the preferred embodiments thereof with reference to the accompanying drawings, in which.

DETAILED DESCRIPTION OF THE PREFERRED EMBODIMENT

The following description will explain the details of the embodiments according to the present invention with reference to the drawings.

Figure 1A:
FIGS. 1(A) to (F) are cross sectional views of main electrode for illustrating each of the manufacturing steps of the main electrode for use in a plasma arc working torch according to the first embodiment of the present invention.
Figure 1B:
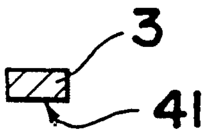
Figure 1C:
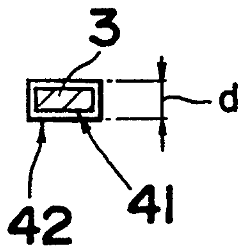
Figure 1D:
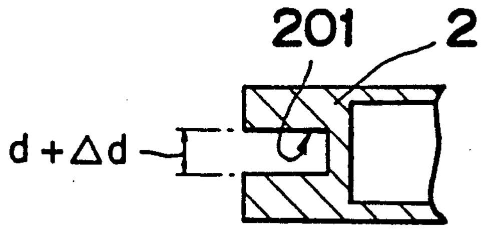
Figure 1E:
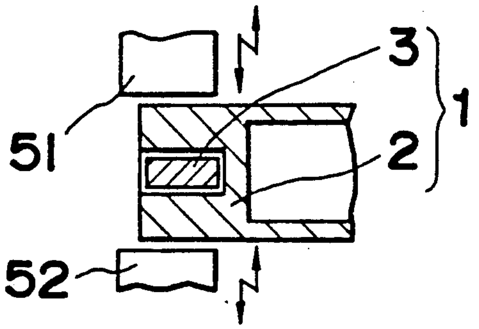
Figure 1F:
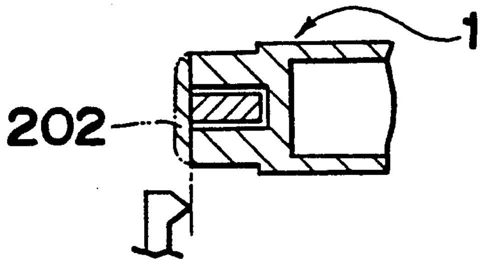
Figure 2A:
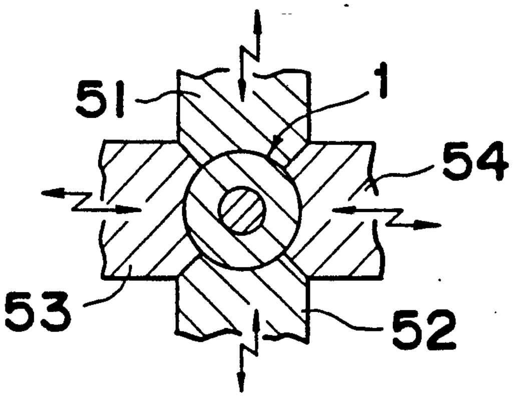
FIGS. 2(A) to (D) correspond to FIG. 1(E) and show sectional views of the main electrode under being pressed with pressing tools in various modification.
Figure 2C:
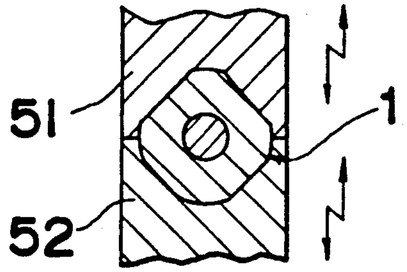
Figure 2B:
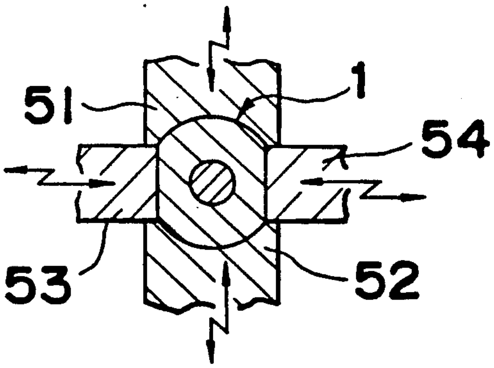
Figure 2D:
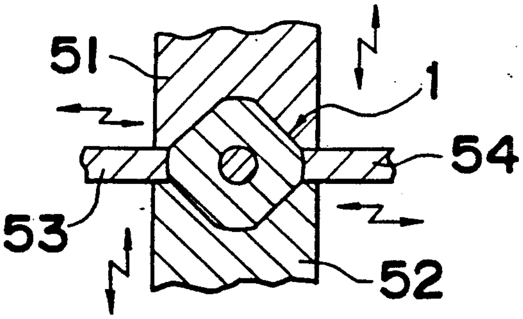

In FIGS. 1(A) to (F) and FIGS. 2(A) to (D), reference numeral 3 designates an insert of refractory metal in a given form, for example, a column having a diameter of 1 to 3 mm and a height of 3 to 5 mm. The insert of refractory metal 3 is made free from the dust or oil and the oxide at the surface by an electrolytic process and an immersion process into an aqueous solution of frolic acid. After that, the insert of refractory metal 3 is plated with nickel film 41 by an electrolytic process at the surface as shown in FIG. 1(B). In this case, it is possible to use a Woodstrike bath for electroplating of nickel on the insert of refractory metal 3. A nickel film in a suitable thickness of 0.1 to 20 micron meter can be obtained by a current density of 1 to 10 A/dm$^2$ and preferably 2 to 4 A/dm$^2$ for plating time of 10 to 15 minutes. After that, the insert of refractory metal 3 having the nickel film plated thereon is further plated with silver film 42 as shown in FIG. 1(C). It is assumed that the insert of refractory metal 3 having the nickel film and a silver film plated thereon is in a diameter of d. A hollow 201 formed in a base electrode 2 made of copper or copper alloy is in a diameter of $d+\Delta d$ which is slightly larger than the diameter of the insert of refractory metal 3. The insert of refractory metal 3 is inserted into the hollow 201. As shown in FIG. 1 (E) and FIG. 2(A), the base electrode 2 is pressed from the periphery to the center by using pressing tools 51 to 54. During the pressing work, the base electrode 2 is projected beyond the end face of the insert of refractory metal 3 to form a projected portion 202. When a plasma arc working torch is made by using the main electrode 1 having the projected portion 202, the arc generating point at the main electrode 1 moves around the projected portion 202. As a result, the operation life of the main electrode 1 becomes short. Therefore, it is necessary to make the end face of the base electrode 2 to be in the same horizontal plane as the end face of the insert of refractory metal 3 by removing the projected portion 202 with a mechanical work such as a bite cutting or grinding work.

In such a way, it is possible to make the end face of the insert of refractory metal 3 to be in the same horizontal plane as the end face of the base electrode 2. Accordingly, the arc generating point is located only on the end face of the insert of refractory metal 3. This permits the plasma arc working torch to work in a desired manner.

Since the nickel film 41 obtained by the electroplating process is in a high adhesion strength with a refractory metal such as hafnium of the insert 3, the nickel film 41 is not separated from the insert of refractory metal 3 even when it is accidentally subjected to the external force during a manufacturing steps including a step to pressure-mount the insert of refractory metal 3 on the hollow 201 of the base electrode 2. Further, the high strength of the adhesion between the nickel film 41 and the insert of refractory metal 3 prevents the nickel film 41 from separating from the insert of refractory metal 3 even when the base electrode 2 is pressed in a direction from the periphery to the center. This permits the insert of refractory metal 3 to be pressure-mounted on the hollow 201 of the base electrode 2. That is, the main electrode 1 for use in a plasma arc working torch can be easily manufactured in a reliable manner. Further, at the operation of a plasma arc working torch, the insert of refractory metal 3 mounted strongly under pressure on the hollow 201 of the base electrode 2 can not be disconnected from the insert of refractory metal 3 when the main electrode 1 is heated during the operation of a plasma arc working torch. The main electrode for use in a plasma arc working torch according to the embodiment of the present invention has another feature that the nickel film does not essentially form the nickel oxide which is resistant to the thermal conduction. Therefore, the heat generated at the insert of refractory metal during the operation of the plasma arc working torch is rapidly transferred from the nickel film 41 to the base electrode 2 through the silver film 42 and is absorbed by a cooling agent for the base electrode 2. As a result, the main electrode 1 can not be over-heated beyond a given temperature and is sure to maintain a long operation life.

Figure 3:
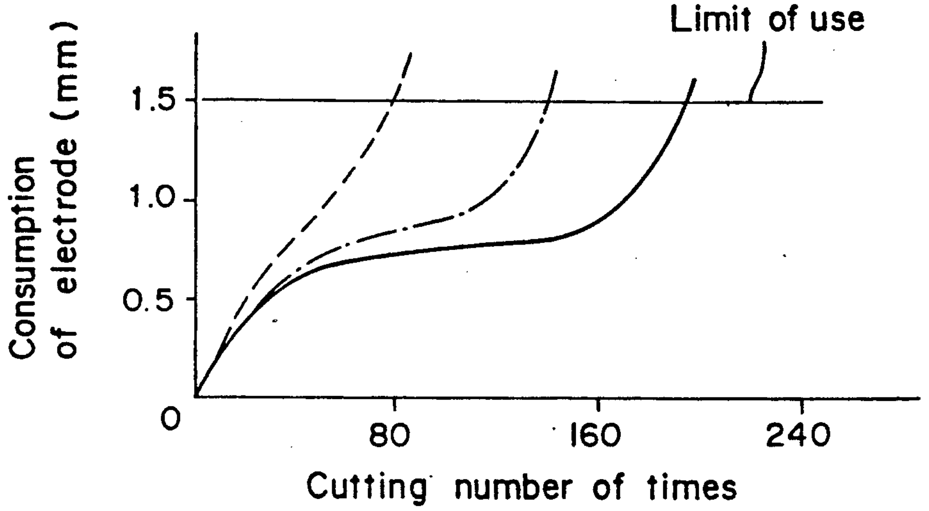
FIG. 3 is a graph showing the operation life of the main electrode wherein a solid line shows the operation life of the main electrode according to the first embodiment of the present invention and a dotted line and a chain line show the operation life of the main electrodes known in the prior art.

FIG. 3 is a graph showing an operation life of various main electrodes for use in a plasma arc working torch in which a dotted line indicates the operation life of the main electrode having an insert of refractory hafnium metal without plated metal known in the prior art, a chain line indicates the operation life of the conventional main electrode obtained by silver soldering an insert of refractory metal having the zinc film and silver film plated sequentially thereon to a base electrode and a solid line indicates the operation life of the main electrode according to the first embodiment of the present invention. It is clear from FIG. 3 that the main electrode for use in a plasma arc working torch according to the present invention has an operation life longer by 30% than the conventional electrode shown in a chain line. The following shows the cutting condition of the plasma arc working torch shown in FIG. 3:

cutting speed=40 cm/min;
cutting length=30 cm/one time;
electric current=120 A;
cutting material of work=SS41, thickness=16 mm;
cutting time for one time=45 seconds.

FIGS. 2 (A) to (D) show a modification of pressing tools 51 to 54 which are used for pressing the base electrode in a direction from the periphery to the center. As shown in FIGS. 2 (B) to (D), after pressing, there are formed a couple of pressed surfaces parallel to each other. In this case, it is possible to use a couple of the parallel pressed surfaces as a tool engaging surface for mounting or dismounting the main electrode on or from a plasma are working torch. Accordingly, it is possible to omit a working step for forming the tool engaging surface at the main electrode. As a result, it is possible to manufacture the main electrode 1 in a low cost. Further, the insert of refractory metal 3 can be composed of zirconium.

In the manufacturing steps mentioned above, the insert of refractory metal 3 can be most preferably electroplated with nickel by using a Woodstrike bath. However, it is possible to use any other nickel electroplating baths such as a sulfamine acid bath or a Watt bath if a manufacturing step permits to change, for example, the plating speed or the adhesion strength between the plated nickel film and the insert of refractory metal.

Further, in view of the thermal conduction and a manufacturing cost, it is the best way to apply silver film to the insert of refractory metal having the nickel film electroplated thereon. However, it is possible to use gold, platinum or rhodium in place of silver.

Next, the detailed description will be directed to the second embodiment of the present invention.

Figure 4:
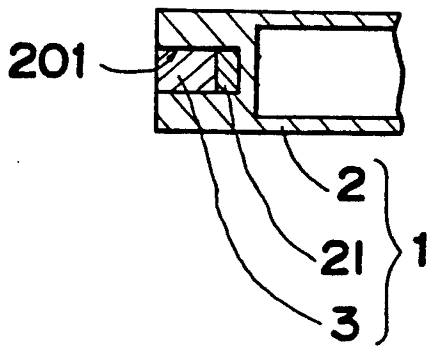
FIG. 4 is a cross sectional view of the main electrode according to the second embodiment of the present invention.
Figure 5A:
FIGS. 5(A) to (F) are cross sectional views of the main electrode according to the third embodiment of the present invention and illustrate each of the manufacturing steps of the main electrode for use in a plasma arc working torch.
Figure 5B:
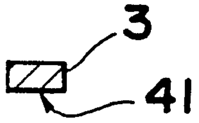
Figure 5C:
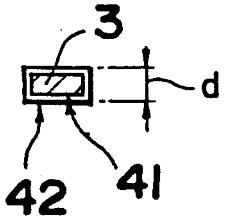
Figure 5D:
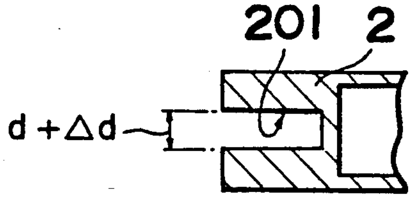
Figure 5E:
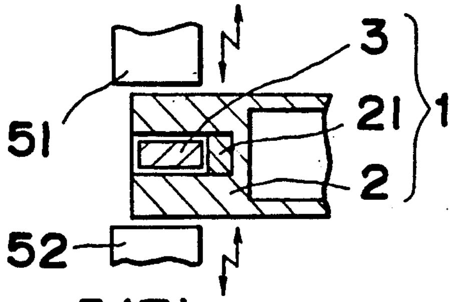
Figure 5F:
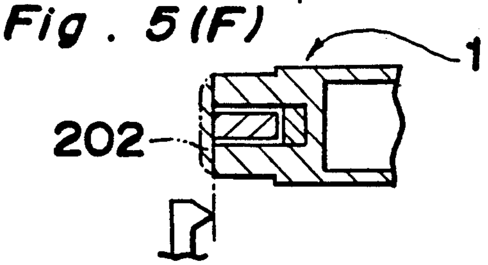

In FIG. 4, reference numeral 2 designates a base electrode which is composed of copper or copper all and is cooled by a cooling agent. Reference numeral 3 designates an insert of refractory metal such as hafnium or zirconium which is formed into, for example, a column. Reference numeral 21 designates a material such as tin, lead or tin-lead alloy having a melting point lower than that of the base electrode 2. The material having a low melting point 21 first and the insert of refractory metal 3 next are tightly inserted in a hollow formed in the base electrode 2 by any available method such as a pressure mounting, welding mounting or caulking mounting. That is, the material having a low melting point is positioned in a room formed between the bottom face of the hollow at the base electrode 2 and the insert of refractory metal 3.

As a result, a main electrode 1 is consisted of the base electrode 2, the material having a low melting point 21 and the insert of refractory metal 3.

In the main electrode 1 having a structure mentioned above, the material having a low melting point 21 has generally ductile property. When the insert of refractory metal 3 is tightly inserted into the hollow at the base electrode 2 after the insertion of the material having a low melting point 21, there is no complete engagement among the bottom face of the hollow, the end face of the insert of refractory metal 3 and the material having a low melting point 21 because air is included in an air-tight room between the bottom face of the hollow and the end face of the insert of refractory metal 3. During the operation of the plasma arc working torch, the main electrode 1 is heated up to a high temperature. The insert of refractory metal 3 is heated at about 1000° C. at the heading face and at about 600° C. at the end face facing to the bottom face of the hollow. Accordingly, the material having a low melting point 21 melts and produces a thermal connection between the end face of the insert of refractory metal 3 and the bottom face of the hollow formed in the base electrode 2 even when there is no complete engagement among the bottom face of the hollow at the base electrode 2, the material having a low melting point 21 and the end face of the insert of refractory metal 3. The heat generated at the insert of refractory metal 3 during the operation of plasma arc working torch is rapidly transferred through the molten material 21 having a low melting point to the base electrode 2 and is absorbed by a cooling agent for the base electrode 2. As a result, the main electrode 1 is not heated at a temperature higher than a given temperature and is ensured to be in a longer operation life than the conventional electrode.

Next description will be conducted to the third embodiment of the present invention.

FIGS. 5(A) to (F) include a content similar to that of FIGS. 1(A) to (F). A different point between those FIGS. will be clearly described here.

In a main electrode 1 shown in FIG. 5, a base electrode 2 has a hollow formed at the heading part thereof. A material 21 such as tin, lead or tin-lead alloy having a melting point lower than that of the base electrode 2 is placed at the bottom of the hollow. In FIG. 5, the hollow formed in the heading part of the base electrode 2 has a depth larger than that of the hollow shown in FIG. 1. A main electrode 1 is composed of the base electrode 2, a material having a low melting point and an insert of refractory metal 3. In a similar way to that described with reference to FIG. 1, the insert of refractory metal is plated with nickel film 41 and a noble metal film 42. It is assumed that the insert of refractory metal 3 having the nickel film and the noble metal film plated thereon has a diameter of d. The hollow 201 formed in the base electrode 2 composed of copper or copper alloy has a diameter $d+\Delta d$ which is slightly larger than the diameter d of the insert of refractory metal 3. As shown in FIG. 5(D), the material having a low melting point 21 and the insert of refractory metal 3 are sequentially inserted into the hollow 201 formed at the base electrode 2. As shown in FIG. 5(E), the base electrode 2 is pressed in a direction from the periphery to the center by using pressing tools 51 to 54. After pressing, the projected part at the end face of the base electrode 2 is ground off by any available mechanical method so that the base electrode 2 is positioned at a same horizontal plane as the insert of refractory metal 3 as shown in FIG. 5(F). These working steps are similar to those described with reference to FIGS. 1 and 2.

Since the nickel film 41 obtained by the electroplating process is in a high adhesion strength with hafnium refractory metal of the insert 3, the nickel film 41 is not separated from the insert of refractory metal 3 even when it is accidentally subjected to the external force during a manufacturing steps including a step for pressure-mounting the insert of refractory metal 3 on the hollow 201 of the base electrode 2. Further, the high strength of the adhesion between the nickel film 41 and the insert of refractory metal 3 prevents the nickel film 41 from separating from the insert of refractory metal 3 at a working step in which the base electrode 2 is pressed in a direction from the periphery to the center. This permits the insert of refractory metal 3 to be pressure-mounted on the hollow 201 of the base electrode 2. That is, the main electrode 1 for use in a plasma arc working torch can be easily manufactured in a reliable manner. Further, at the operation of a plasma arc working torch, the insert of refractory metal 3 mounted strongly under pressure on the hollow 201 of the base electrode 2 can not be disconnected from the hollow 201, when the main electrode 1 is heated during the operation of a plasma arc working torch. The main electrode for use in a plasma arc working torch according to the embodiment of the present invention has another feature that the nickel film does not essentially form the oxide which is resistant to the thermal conduction. Therefore, the heat generated at the insert of refractory metal during the operation of the plasma arc working torch is rapidly transferred from the nickel film 41 to the base electrode 2 through the silver film 42. In addition to this effect, the main electrode according to the third embodiment of the present invention has the material with a low melting point inserted in the hollow of the base electrode 2. During the operation of the plasma arc working torch, the main electrode is heated up to a high temperture sufficiently enough to melt the material having a low melting point. The molten material having a low melting point makes surely the thermal connection between the bottom face of the hollow and the insert of refractory metal 3. The heat generated at the insert of refractory metal 3 is rapidly transferred through the thermal connection to the base electrode 2 and is absorbed by a cooling agent for the base electrode 2. As a result, the main electrode 1 can not be over-heated up to a temperature beyond a given temperature and is sure to maintain a longer operation life than the convention main electrode.

Figure 6:
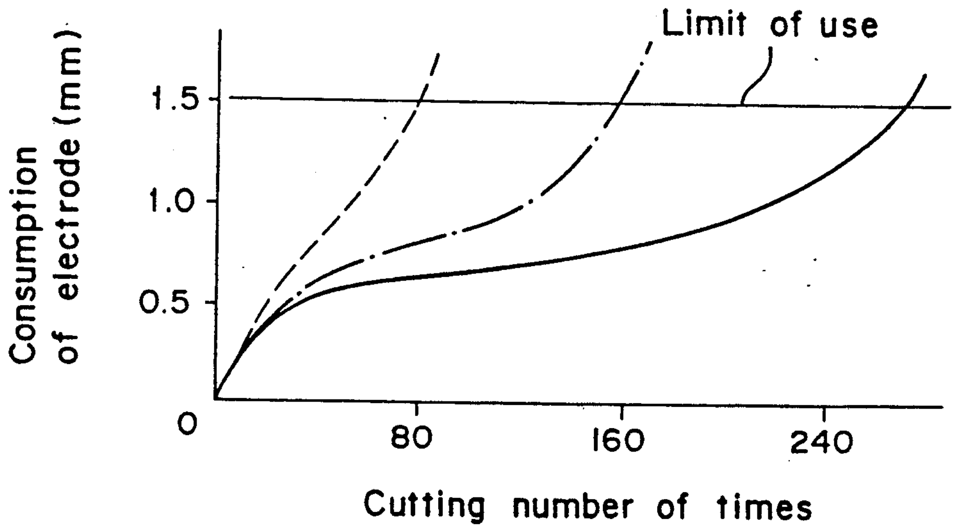
FIG. 6 is a graph for illustrating the operation life of the main electrode, wherein a chain line corresponds to the operation life according to the second embodiment of the present invention, a solid line corresponds to the operation life according to the third embodiment of the present invention and a dotted line corresponds to the operation life according to the prior art.
Figure 7:
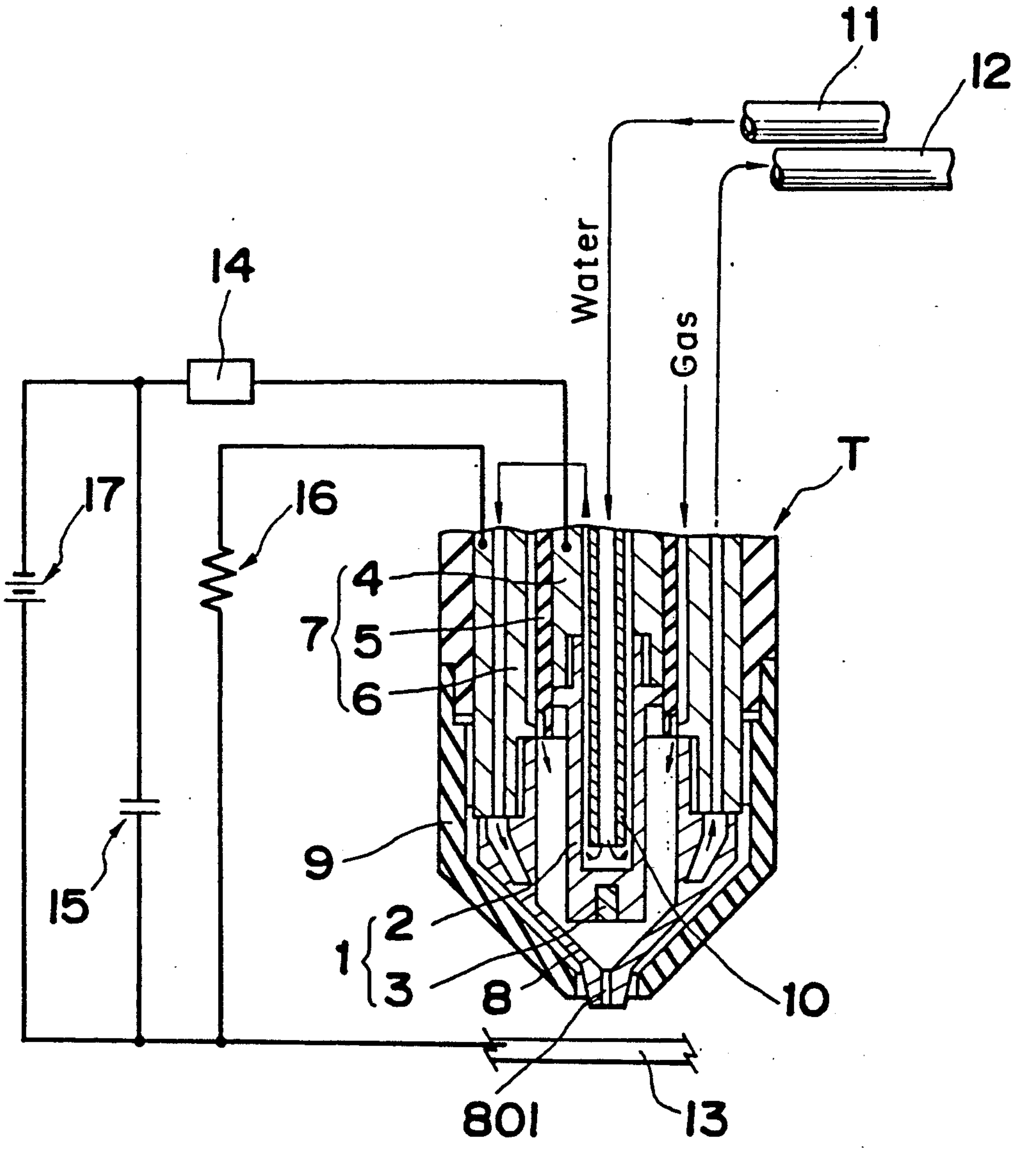
Fig. 7 PRIOR ART
FIG. 7 is a fundamental part of a cross sectional view of a plasma arc working torch according to the prior art.

FIG. 6 shows a graph indicating an operation life of various main electrodes in which a dotted line shows the operation life of the conventional main electrode having an insert of refractory hafnium metal, a chain line shows an operation life of the main electrode, according to the second preferred embodiment, comprising a base electrode 2 having the hollow formed therein, an inserting material 3 of refractory metal inserted in the hollow and a material 21 having a low melting point filled in a space defined by the base electrode 2 and the inserting material 3, and a solid line shows an operation life of the main electrode comprising a base electrode 2 having the hollow formed therein, a material having a low melting point 21 inserted in the hollow and an insert of refractory metal plated with nickel film and silver film according to the third embodiment of the present invention. It is clear from FIG. 6 that the main electrode according to the second or third embodiment of the present invention has an operation life more than two or three times longer than that of the conventional electrode.

Cutting condition of the plasma arc working torch of FIG. 6

Cutting speed; 40 cm/min;
Cutting length; 30 cm/ one time
Electric current; 120 A;
Cutting material; SS41 steel, plate thickness = 16 mm;
Cutting time for one time = 45 seconds.

The main electrode according to the first embodiment of the present invention has the insert of refractory metal electroplated with nickel. Since the nickel film 41 obtained by the electroplating process is in a high adhesion strength with refractory metal of the insert 3, the nickel film 41 is not separated from the insert of refractory metal 3 even when it is accidentally subjected to the external force during a manufacturing steps including a step for pressure-mounting the insert of refractory metal 3 on the hollow 201 of the base electrode 2. Further, the high strength of the adhesion between the nickel film 41 and the insert of refractory metal 3 prevents the nickel film 41 from separating from the insert of refractory metal 3 at a working step in which the base electrode 2 is pressed in a direction from the periphery to the center. This permits the insert of refractory metal 3 to be pressure-mounted on the hollow 201 of the base electrode 2. That is, the main electrode 1 for use in a plasma arc working torch can be easily manufactured in a reliable manner. Further, at the operation of a plasma arc working torch, the insert of refractory metal 3 mounted strongly under pressure on the hollow 201 of the base electrode 2 can not be disconnected from the hollow 201 when the main electrode 1 is heated during the operation of a plasma arc working torch. The main electrode for use in a plasma arc working torch according to the first embodiment of the present invention has another feature that the nickel film does not essentially form the oxide which is resistant to the thermal conduction. Therefore, the heat generated at the insert of refractory metal during the operation of the plasma arc working torch is rapidly transferred from the nickel film 41 to the base electrode 2 through the silver film 42 and is absorbed by the cooling agent for the base electrode 2. Therefore, the main electrode according to the first embodiment is not overheated up to a temperature higher than the given temperature and is sure to maintain a longer operation life than the conventional main electrode.

The main electrode according to the second embodiment of the present invention has the material with a low melting point inserted in the hollow formed in the base electrode 2. During the operation of the plasma arc working torch, the main electrode 1 is heated up to a high temperature sufficiently enough to melt the material having a low melting point 21. The molten material having a low melting point produces a thermal connection between the end face of the insert of refractory metal 3 and the bottom face of the hollow formed in the base electrode 2 even when there is no complete engagement among the bottom face of the hollow at the base electrode 2, the material having a low melting point 21 and the end face of the insert of refractory metal 3. The heat generated at the insert of refractory metal 3 during the operation of plasma arc working torch is rapidly transferred through the molten material 21 having a low melting point to the base electrode 2 and is absorbed by a cooling agent for the base electrode 2. As a result, the main electrode 1 is not heated at a temperature higher than a given temperature and is ensured to be in a longer operation life than the conventional electrode.

The main electrode according to the third embodiment of the present invention is achieved by combining the effects of the first embodiment and the second embodiment. The heat generated at the insert of refractory metal is rapidly transferred to the base electrode 2 and is absorbed by the cooling agent for the base electrode 2. The main electrode is not over-heated beyond the given temperature and is sure to maintain a extremely longer operation life than the conventional electrode.

It is understood that various other modifications will be apparent to and can be readily made by those skilled in the art without departing from the scope and spirit of the present invention. Accordingly, it is not limited to the description as set forth herein, but rather that the claims be construed as encompassing all the features of patentable novelty that reside in the present invention, including all features that would be treated as equivalents thereto by those skilled in the art to which the present invention pertains.

What is claimed is:

1. An electrode for use in a plasma arc working torch, said electrode having an insert of refractory metal inserted in the hollow formed in a base electrode which is composed of copper or copper alloy and is cooled by a cooling agent, wherein said insert of refractory metal has a nickel film electroplated and a noble metal film plated thereon in a sequential way and is inserted in said hollow having a diameter slightly larger than that of said insert of refractory metal, and said base electrode having said insert of refractory metal inserted in the hollow is pressed through pressing tools in a direction from the periphery to the center thereof and is ground at the projected part produced with the pressing work by any available mechanical work so that both heading faces of the resultant base electrode and said insert of refractory metal are positioned at the same horizontal plane.

2. An electrode for use in a plasma arc working torch, said electrode having an insert of refractory metal inserted in the hollow formed in a base electrode which is composed of copper or copper alloy and is cooled by a cooling agent, wherein a material with a lower melting point than that of said base electrode is included in a room formed between the bottom face of said hollow and the end face of said insert of refractory metal, said material being melted by the heat produced during operation of the plasma arc working torch.

3. An electrode for use in a plasma arc working torch, said electrode having an insert of refractory metal inserted in the hollow formed in a base electrode which is composed of copper or copper alloy and is cooled by a cooling agent, wherein said insert of refractory metal has a nickel film electroplated and a noble metal film plated thereon in a sequential way and said hollow has a diameter slightly larger than that of said insert of refractory metal and receives a material having a lower melting point than said base electrode therein, said insert of refractory metal is inserted in said hollow receiving said material with a lower melting point; and the base electrode having both said insert of refractory metal and said material with a lower melting point inserted in the hollow is pressed through pressing tools in a direction from the periphery to the center thereof and is ground at the projected part produced with the pressing work by any available mechanical work so that both heading faces of the resultant base electrode and said insert of refractory metal are positioned at the same horizontal plane.

4. An electrode for use in a plasma arc working torch, said electrode having an insert of refractory metal inserted in the hollow formed in a base electrode which is composed of copper or copper alloy and is cooled by a cooling agent according to claim 1 or 3, wherein said pressing tools for pressing the periphery of the end of said base electrode in an inward direction thereof comprise more than two pressing tools and are capable of producing at least one couple of pressed surfaces parallel to each other.

* * * * *